(12) United States Patent
Bender

(10) Patent No.: US 10,969,054 B1
(45) Date of Patent: Apr. 6, 2021

(54) TUBE SHIELDING SYSTEM

(71) Applicant: Brian Bender, Fort Worth, TX (US)

(72) Inventor: Brian Bender, Fort Worth, TX (US)

(*) Notice: Subject to any disclaimer, the term of this patent is extended or adjusted under 35 U.S.C. 154(b) by 0 days.

(21) Appl. No.: 16/361,105

(22) Filed: Mar. 21, 2019

Related U.S. Application Data

(60) Provisional application No. 62/646,191, filed on Mar. 21, 2018.

(51) Int. Cl.
*F16L 57/00* (2006.01)
*F16L 59/10* (2006.01)

(52) U.S. Cl.
CPC ............. *F16L 57/00* (2013.01); *F16L 59/10* (2013.01)

(58) Field of Classification Search
CPC ............ F16L 57/00; F16L 59/00; F16L 59/10
USPC ................... 138/110, 149, 123–126; 385/107
See application file for complete search history.

(56) References Cited

U.S. PATENT DOCUMENTS

| 4,171,463 | A | * | 10/1979 | Watkins | H01B 7/282 174/120 R |
| 4,488,577 | A | * | 12/1984 | Shilad | F16L 59/153 138/103 |
| 7,287,489 | B1 | * | 10/2007 | O'Brien | A01K 15/02 119/712 |
| 2003/0198659 | A1 | * | 10/2003 | Hoffmann | D04H 3/16 424/411 |

FOREIGN PATENT DOCUMENTS

JP   06058466 A * 3/1994

* cited by examiner

*Primary Examiner* — Patrick F Brinson
(74) *Attorney, Agent, or Firm* — Richard Eldredge; Leavitt Eldredge Law Firm

(57) ABSTRACT

A tube shielding system prevents pests such as rodents and insects from damaging tubes or pipes, particularly those made of plastics or other soft materials. The tubes are wrapped with a protective barrier that has a pest control layer. The pest control layer a deterrent that could be physical or chemical. Examples of deterrents are steel mesh, sand, peppermint and capsaicin.

5 Claims, 3 Drawing Sheets

TUBE SHIELDING SYSTEM

BACKGROUND

1. Field of the Invention

The present invention relates generally to plumbing systems, and more specifically, to covering from tubing to prevent heat transfer, damage or the like.

2. Description of Related Art

Plumbing systems are well known in the art and are effective means to distribute liquid, particularly water from its source to its point of use. For example, U.S. Pat. No. 4,316,870A dated Jun. 5, 1980 relates the use of plastic tubing and joining methods thereof.

One of the problems commonly associated with tubing as described above is it limited efficiency. For example, pests are known to gnaw or chew through plastics and such materials causing leaks and necessitating replacement or repair of the damaged tubing.

Accordingly, although great strides have been made in the area of plumbing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
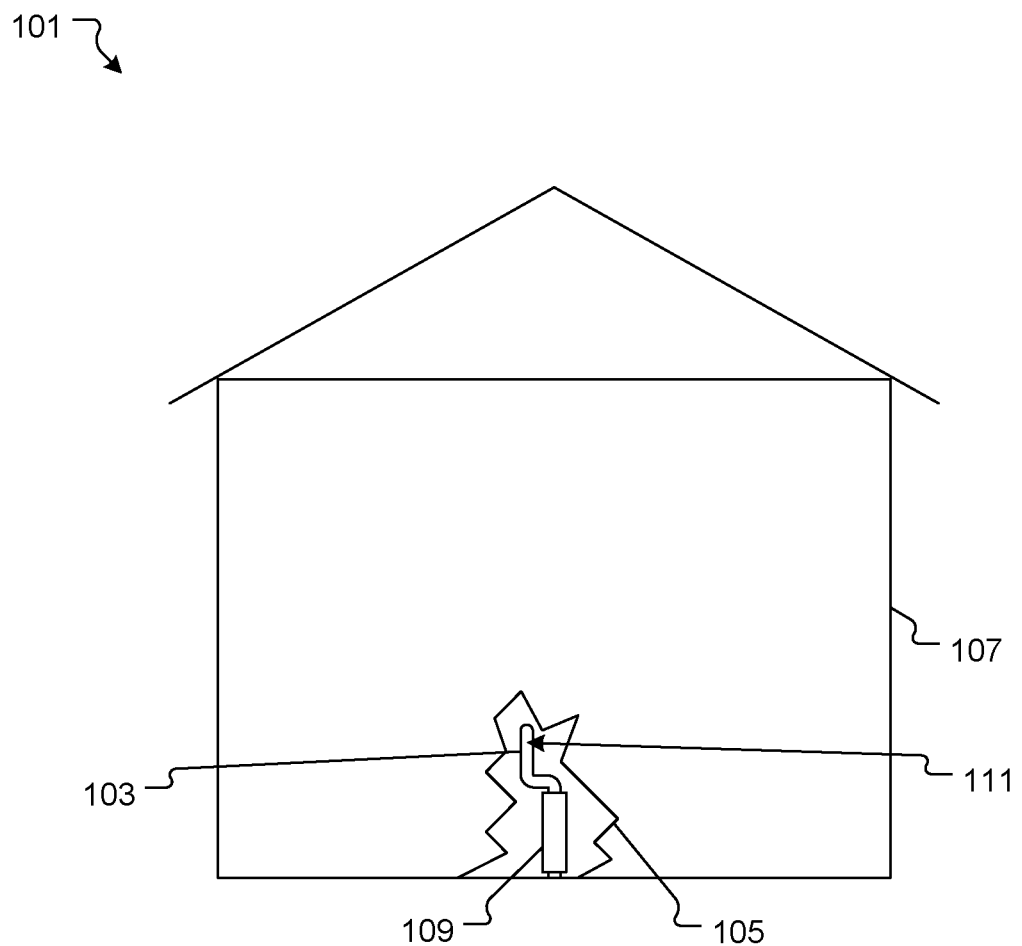
FIG. 1 is a front view of a tube shielding system in accordance with a preferred embodiment of the present application system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional plumbing systems. Specifically, the invention of the present application prevents pests from damaging plastic tubing. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of a tube shielding system in accordance with a preferred embodiment of the present application. It will be appreciated that system 101 overcomes one or more of the above-listed problems commonly associated with conventional plumbing systems.

In the contemplated embodiment, system 101 includes tube 103 for carrying a liquid within the wall 105 of a building 107. The tube 103 having a protective barrier 109 attached to the outside surface 111 thereof.

Figure 2:
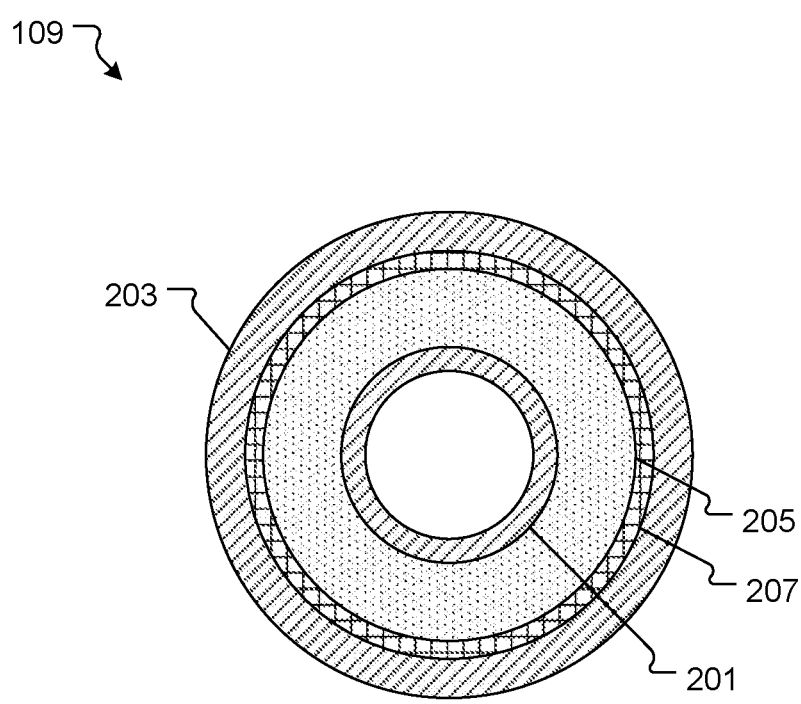
FIG. 2 is a cross-sectional side view of the protective barrier of FIG. 1.

The protective barrier 109 as depicted in FIG. 2, including an inner non-permeable layer 201 and an outer non-permeable layer 203 between which an insulating layer 205 is attached. The insulating layer 205 having a pest control layer 207 depicted as a steel mesh in this embodiment.

It should be appreciated that one of the unique features believed characteristic of the present application is that the pest control layer 207 prevents rodents or other threats from damaging the tube 103.

Figure 3:
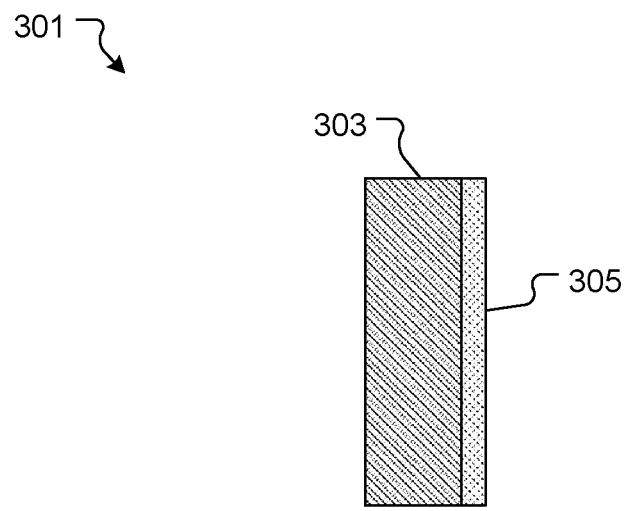
FIG. 3 is a cross-sectional side view of an alternative embodiment of the pest control layer of FIG. 2.

Referring now to FIG. 3 an alternative embodiment of the pest control layer 207 is depicted. Embodiment 301 including a body 303 having sand 305 attached thereto. It will be appreciated that any method of deterring pests from damaging the tube is contemplated and that sand 305 is an example of a physical deterrent.

Figure 4:
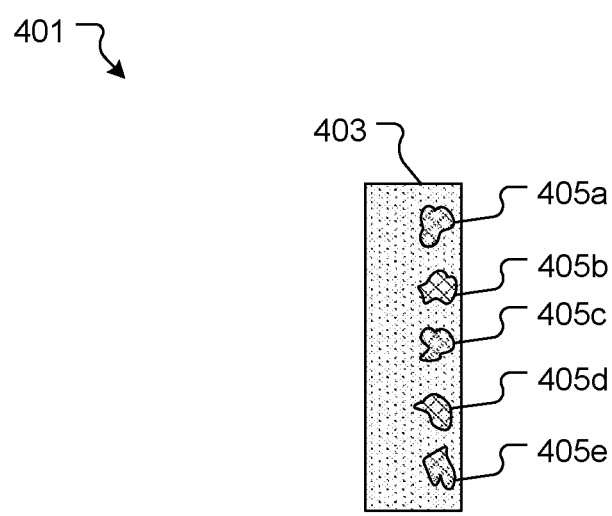
FIG. 4 is a cross-sectional side view of an alternative embodiment of the pest control layer of FIG. 2.

Referring now to FIG. 4 an alternative embodiment of the pest control layer 207 is depicted. Embodiment 401 including a permeable body 403 having a substance 405 such as peppermint embedded therein. It will be appreciated that any method of deterring pests from damaging the tube is contemplated and that peppermint is an example of a substance 405 that acts as a chemical deterrent. Another example of substance 405 is capsaicin which is a known irritant to animals.

It will also be appreciated that insulating layer 205 could be the body 303 or 403.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A tube shielding system comprising:
   a tube having an outer surface;
   a protective barrier secured to the outer surface of the tube, the protective barrier consisting essentially of:
   an inner non-permeable layer secured to the outer surface of the tube;
   an insulating layer secured to the inner non-permeably layer;
   a pest control layer secured to the insulating layer, the pest control layer is composed of sand material; and
   an outer non-permeable layer;
   wherein the insulating layer is disposed between the pest control layer and the inner non-permeable layer; and
   wherein the pest control layer is disposed between the outer non-permeable layer and the insulating layer;
   wherein pests are prevented from accessing the tube through the pest control layer.

2. The system of claim 1 wherein the pest control layer is steel mesh.

3. The system of claim 1 wherein the pest control layer includes a chemical deterrent.

4. The system of claim 3 wherein the chemical deterrent is peppermint.

5. The system of claim 3 wherein the chemical deterrent is capsaicin.

* * * * *